United States Patent
Chen et al.

(10) Patent No.: US 12,238,633 B2
(45) Date of Patent: Feb. 25, 2025

(54) ACCESS CONTROL AT A RELAY USER EQUIPMENT

(71) Applicant: Apple Inc., Cupertino, CA (US)

(72) Inventors: Yuqin Chen, Beijing (CN); Dawei Zhang, Saratoga, CA (US); Fangli Xu, Beijing (CN); Haijng Hu, Los Gatos, CA (US); Longda Xing, San Jose, CA (US); Murtaza A. Shikari, Mountain View, CA (US); Sethuraman Gurumoorthy, San Ramon, CA (US); Sree Ram Kodali, San Jose, CA (US); Srinivasan Nimmala, San Jose, CA (US); Srirang A. Lovlekar, Fremont, CA (US)

(73) Assignee: Apple Inc., Cupertino, CA (US)

( * ) Notice: Subject to any disclaimer, the term of this patent is extended or adjusted under 35 U.S.C. 154(b) by 366 days.

(21) Appl. No.: 17/755,700

(22) PCT Filed: Nov. 28, 2019

(86) PCT No.: PCT/CN2019/121546
§ 371 (c)(1),
(2) Date: May 5, 2022

(87) PCT Pub. No.: WO2021/102782
PCT Pub. Date: Jun. 3, 2021

(65) Prior Publication Data
US 2022/0394592 A1 Dec. 8, 2022

(51) Int. Cl.
*H04W 40/24* (2009.01)
*H04W 24/08* (2009.01)
*H04W 88/04* (2009.01)

(52) U.S. Cl.
CPC ........ *H04W 40/246* (2013.01); *H04W 24/08* (2013.01); *H04W 88/04* (2013.01)

(58) Field of Classification Search
None
See application file for complete search history.

(56) References Cited

U.S. PATENT DOCUMENTS

| 10,531,365 B2 * | 1/2020 | Kaur ..................... H04W 48/10 |
| 2013/0137438 A1 * | 5/2013 | Serravalle ............. H04W 36/22 455/437 |

(Continued)

FOREIGN PATENT DOCUMENTS

| CN | 106604341 | 4/2017 |
| CN | 109892003 | 6/2019 |

(Continued)

OTHER PUBLICATIONS

Author Unknown, Bearer modelling and QoS considerations for layer-2 relaying, pp. 1-3, 17 Feb. 17, 2017.*

(Continued)

*Primary Examiner* — Christopher M Crutchfield
(74) *Attorney, Agent, or Firm* — Fay Kaplun & Marcin, LLP

(57) ABSTRACT

A relay user equipment (UE) configured to operate as a relay between a remote UE and a network component performs a method. The method includes determining at least one relay capability of the relay UE and performing a relay access control operation that indicates to the remote UE whether the remote UE is permitted to use the relay UE as the relay.

15 Claims, 8 Drawing Sheets

(56) References Cited

U.S. PATENT DOCUMENTS

| | | | |
|---|---|---|---|
| 2015/0029866 A1* | 1/2015 | Liao | H04W 48/14 |
| | | | 370/254 |
| 2018/0070400 A1 | 3/2018 | Wu et al. | |
| 2018/0092017 A1* | 3/2018 | Freda | H04W 76/23 |
| 2018/0255505 A1 | 9/2018 | Thyagarajan et al. | |
| 2019/0239147 A1* | 8/2019 | Chun | H04W 88/06 |
| 2019/0335518 A1 | 10/2019 | Dimitrovski et al. | |
| 2021/0204348 A1* | 7/2021 | Chen | H04W 76/30 |
| 2023/0023639 A1* | 1/2023 | Shi | H04W 88/04 |

FOREIGN PATENT DOCUMENTS

| | | |
|---|---|---|
| WO | 2014/183619 | 11/2014 |
| WO | 2017/075921 | 5/2017 |

OTHER PUBLICATIONS

LG Electronics, "Adding UE-to-Network Relay capability in UE nework capability IE", 3GPP TSG-CT WG1 Meeting #95bis, C1-160259, Jan. 10, 2016, 19 sheets.

Alcatel-Lucent Shanghai Bell et al., "D2D system design enhancement to support out-of-coverage and partial coverage discovery for UE-network relay", 3GPP TSG RAN WGI Meeting #80bis, R1-151328, Apr. 24, 2015, 4 sheets.

Samsung, "Evaluation results of relay selection schemes", 3GPP TSG RAN WGI Meeting #82, R1-154127, Aug. 28, 2015, 8 sheets.

* cited by examiner

ACCESS CONTROL AT A RELAY USER EQUIPMENT

BACKGROUND

A user equipment (UE) may establish a connection to at least one of multiple networks or types of networks. In some scenarios, the UE may communicate with the network using a direct communication link to a base station of the corresponding network. In other scenarios, the UE may communicate with the network using a UE to network relay. For example, the UE may establish a direct communication link with a further UE that is camped on a base station of the corresponding network. In this type of arrangement, data and information sent to the network by the UE may initially be transmitted to the further UE and then relayed to the base station by the further UE on behalf of the UE. For downlink communications intended for the UE, data and information may initially be sent to the further UE and then relayed to the UE by the further UE on behalf of the network.

The UE may communicate with the further UE via a sidelink. The term sidelink refers to a communication link that may be utilized for device-to-device communication (D2D). The further UE may be configured with both an uplink and a sidelink simultaneously. From the further UE perspective, uplink and sidelink communications may utilize the same resources (e.g., frequency, hardware, etc.). During operation, there may be instances where the further UE (e.g., the relay UE) may not desire to operate as a relay UE for various reasons.

SUMMARY

Some exemplary embodiments include a method performed by a relay user equipment (UE) configured to operate as a relay between a remote UE and a network component. The method includes determining at least one relay capability of the relay UE and performing a relay access control operation that indicates to the remote UE whether the remote UE is permitted to use the relay UE as the relay.

Further exemplary embodiments include a relay user equipment (UE) having a transceiver configured to establish a first communication link between the relay UE and a wireless network and a second sidelink (SL) communication link between the relay UE and a remote UE, wherein the relay UE is further configured to operate as a relay between a remote UE and the wireless network. The relay UE also has a processor configured to determine at least one relay capability of the UE and perform a relay access control operation that indicates to the remote UE whether the remote UE is permitted to use the relay UE as the relay.

Still further exemplary embodiments include an integrated circuit that includes first circuitry configured to determine the at least one relay capability of a user equipment (UE) comprising the integrated circuit, wherein the UE is configured to operate as a relay between a remote UE and a wireless network. The integrated circuit also includes second circuitry configured to perform a relay access control operation that indicates to the remote UE whether the remote UE is permitted to use the UE as the relay.

DETAILED DESCRIPTION

Figure 1:
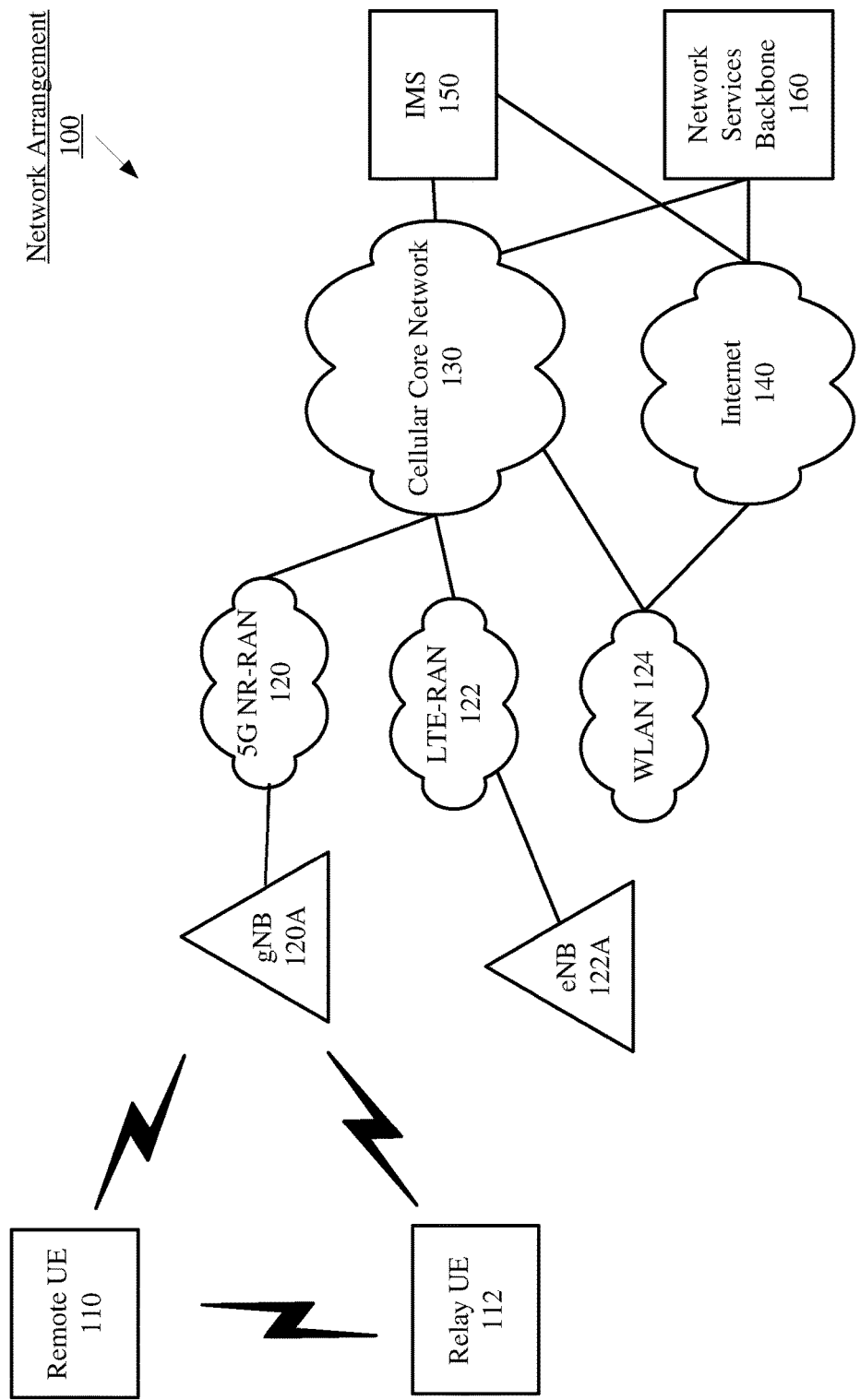
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments describe methods by which a relay UE may control access to the relay UE by remote UEs attempting to use the relay UE as a relay.

The exemplary embodiments are described with regard to the UE. However, the use of a UE is merely provided for illustrative purposes. The exemplary embodiments may be utilized with any electronic component that is configured with the hardware, software, and/or firmware to exchange information (e.g., control information) and/or data with the network. Therefore, the UE as described herein is used to represent any suitable electronic device.

As described above, a UE may communicate directly with a base station or indirectly with the base station using a UE to network relay. To differentiate between UEs, reference will be made to a "remote UE" and a "relay UE." The term "remote UE" may be used to identify a UE that is to operate as a remote endpoint from the base station. The remote UE may connect directly to the base station or indirectly communicate with the base station using a UE to network relay. Throughout this description, the terms UE and remote UE may be used interchangeably. The term "relay UE" may be used to identify a UE that may serve as a relay for the remote UE. The term relay UE is not intended to indicate that the relay UE is actively serving as a relay. Instead, the term relay UE indicates that the UE has the capability of operating as a relay for a remote UE. Further, the relay UE may also be configured as a remote UE simultaneously. Throughout this description, the terms UE, further UE and relay UE may be used interchangeably. However, any reference to a remote UE and a relay UE is merely for illustrative purposes, different networks may refer to similar concepts by a different name.

Throughout this description reference to the network performing an operation may refer to an operation performed at a base station, at a RAN, at a core network, by a network function, at a network services backbone, a network server, any other type of network component or combination thereof. In addition, throughout this description, there will be multiple examples of communications between a relay UE and a remote UE. These communications may be performed via a sidelink (SL) communication link that is a direct device-to-device communication link between the UEs. However, these communications are not required to be via a SL link and may be communicated in a different direct device-to-device communication link.

When the relay UE is acting as a relay for the remote UE, the relay UE should be able to perform access control for the remote UEs, e.g., either permit or restrict the ability of the remote UEs to use the relay UE as a relay. There may be many reasons for the relay UE to include this capability. For example, the relay capabilities (e.g., data forwarding) of the relay UE may degrade for a variety of different reasons. These reasons may include, for example, too many remote UEs using the relay UE as a relay causing congestion, bad channel quality between the relay UE and the network, capacity restriction on the communication link between the relay UE and the network (e.g., gNB), etc. In addition, the use of the relay UE as a relay may degrade the performance of the relay UE itself, e.g., battery drain, deprioritizing traffic directed to the relay UE, etc. Thus, if the relay UE could perform access control to permit or restrict one or more remote UEs from using the relay UE as a relay, the relay UE may be able to selectively support certain high priority relaying functions (e.g., voice forwarding, etc.). The exemplary embodiments provide various methods for the relay UE to perform access control.

FIG. 1 shows an exemplary network arrangement 100 according to various exemplary embodiments. The exemplary network arrangement 100 includes UEs 110, 112. In this exemplary embodiment, it may be considered that the UE 110 is the remote UE and the UE 112 is the relay UE. However, as described above, any UE may act as a remote UE, a relay UE or both. Those skilled in the art will understand that the UEs 110, 112 may be any type of electronic component that is configured to communicate via a network, e.g., a mobile phone, a tablet computer, a smartphone, a phablet, an embedded device, a wearable, an Internet of Things (IoT) device, a massive machine-type communication (mMTC) device, etc. It should also be understood that an actual network arrangement may include any number of UEs being used by any number of users. Thus, the example of two UEs 110, 112 is merely provided for illustrative purposes.

The UEs 110, 112 may communicate directly with one or more networks. In the example of the network configuration 100, the networks with which the UEs 110, 112 may wirelessly communicate are a 5G New Radio (NR) radio access network (5G NR-RAN) 120, a LTE radio access network (LTE-RAN) 122 and a wireless local access network (WLAN) 124. However, the UEs 110, 112 may also communicate with other types of networks and the UEs 110, 112 may also communicate with networks over a wired connection. Therefore, the UEs 110, 112 may include a 5G NR chipset to communicate with the 5G NR-RAN 120, an LTE chipset to communicate with the LTE-RAN 122 and an ISM chipset to communicate with the WLAN 124.

The 5G NR-RAN 120 and the LTE-RAN 122 may be portions of cellular networks that may be deployed by cellular providers (e.g., Verizon, AT&T, Sprint, T-Mobile, etc.). These networks 120, 122 may include, for example, base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 124 may include any type of wireless local area network (WiFi, Hot Spot, IEEE 802.11x networks, etc.).

The base stations (e.g., the gNB 120A, the eNB 122A) may include one or more communication interfaces to exchange data and/or information with camped UEs, the corresponding RAN, the cellular core network 130, the internet 140, etc. Further, the base stations may include a processor configured to perform various operations. For example, the processor of the base station may be configured to perform operations related to link management. However, reference to a processor is merely for illustrative purposes. The operations of the base station may also be represented as a separate incorporated component of the base station or may be a modular component coupled to the base station, e.g., an integrated circuit with or without firmware. For example, the integrated circuit may include input circuitry to receive signals and processing circuitry to process the signals and other information. In addition, in some base stations, the functionality of the processor is split among two or more processors such as a baseband processor and an applications processor. The exemplary embodiments may be implemented in any of these or other configurations of a base station.

Those skilled in the art will understand that any association procedure may be performed for the UEs 110, 112 to connect to the 5G NR-RAN 120 and the LTE-RAN 122. For example, as discussed above, the 5G NR-RAN 120 and the LTE-RAN 122 may be associated with a particular cellular provider where the UEs 110, 112 and/or the user thereof has a contract and credential information (e.g., stored on a SIM card). Upon detecting the presence of the 5G NR-RAN 120, the UEs 110, 112 may transmit the corresponding credential information to associate with the 5G NR-RAN 120. More specifically, the UEs 110, 112 may associate with a specific base station (e.g., the gNB 120A of the 5G NR-RAN 120, the eNB 122A of the LTE-RAN 122).

The UEs 110, 112 may also communicate indirectly with the one or more networks using a UE to network relay. In this example, the UE 110 may be a remote UE and the UE 112 may be a relay UE. In this example, the relay UE 112 may camp on the gNB 120A of the 5G NR-RAN 120 and the remote UE 110 may camp on the relay UE 112. Uplink communications from the remote UE 110 may initially be transmitted over a SL communication link to the relay UE 112. Subsequently, the relay UE 112 may relay the communication to the gNB 120A on behalf of the remote UE 110. Downlink communication from the gNB 120A to the remote UE 110 may initially be sent to the relay UE 112. Subsequently, the relay UE 112 may relay the communication to the remote UE 110 via the SL communication link.

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
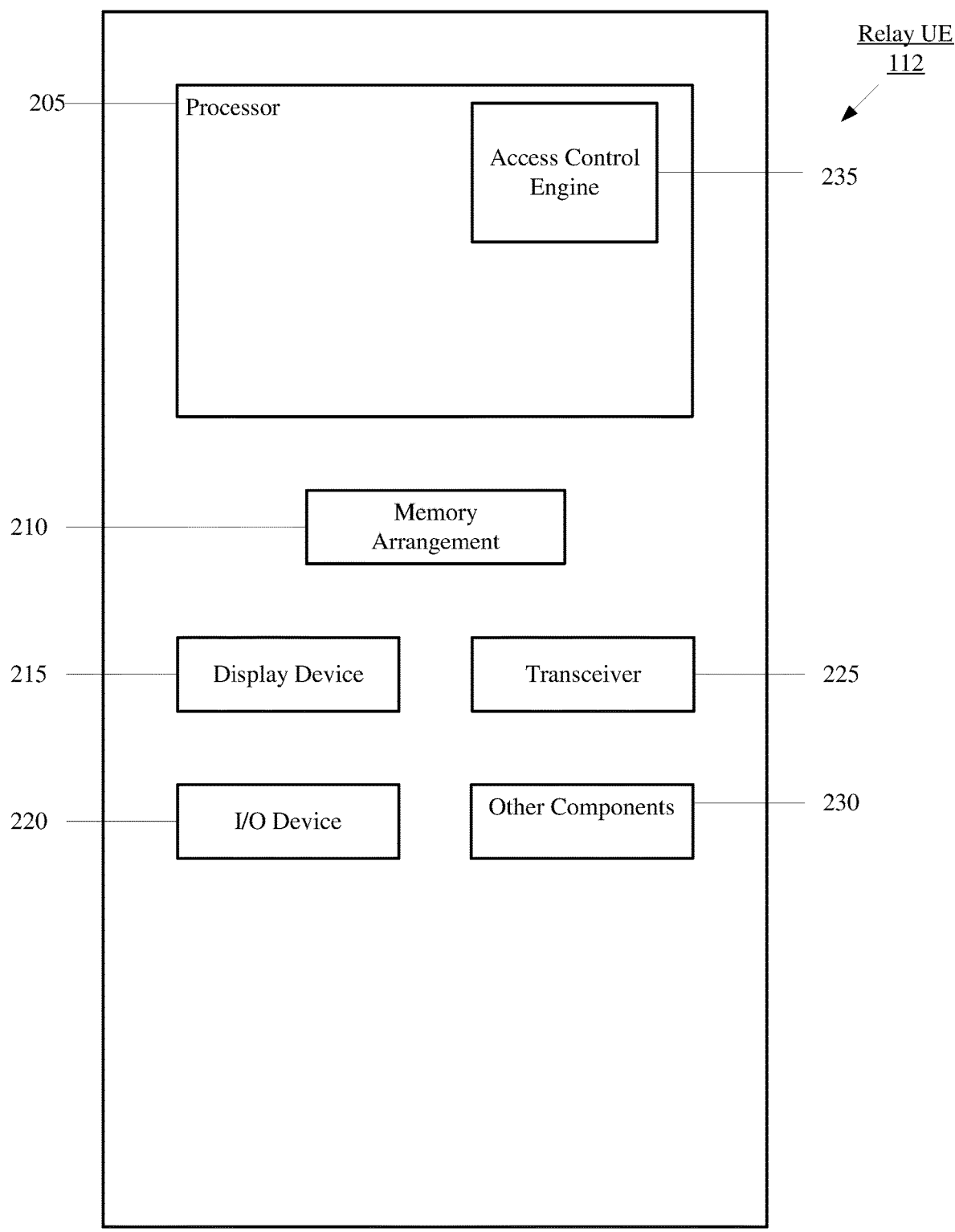
FIG. 2 shows an exemplary UE that may operate as a relay UE according to various exemplary embodiments.

FIG. 2 shows an exemplary UE 112 that may operate as a relay UE according to various exemplary embodiments. The UE 112 will be described with regard to the network arrangement 100 of FIG. 1. In this example, the UE 112 is being described because it is considered to be the relay UE in this example arrangement. However, the description may apply equally to the UE 110 or any other UE that is capable of acting as a relay. The UE 112 may include a processor 205, a memory arrangement 210, a display device 215, an input/output (I/O) device 220, a transceiver 225 and other components 230. The other components 230 may include, for example, a SIM card, an audio input device, an audio output device, a power supply, a data acquisition device, ports to electrically connect the UE 112 to other electronic devices, etc. Those skilled in the art will understand that the UE 112 may represent any electronic component that is capable of operating as a remote UE and/or a relay UE.

The processor 205 may be configured to execute a plurality of engines of the UE 112. For example, the engines may include an access control engine 235. The access control engine 235 may perform various operations related to allowing a remote UE to access the UE 112 as a relay UE. Examples of the various operations will be described in greater detail below.

The above referenced engines each being an application (e.g., a program) executed by the processor 205 is only exemplary. The functionality associated with the engines may also be represented as a separate incorporated component of the UE 112 or may be a modular component coupled to the UE 112, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 112. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, the LTE-RAN 122, the WLAN 124, the UE 112, etc. Accordingly, the transceiver 225 may operate on a variety of different frequencies or channels (e.g., set of consecutive frequencies).

Figure 3:
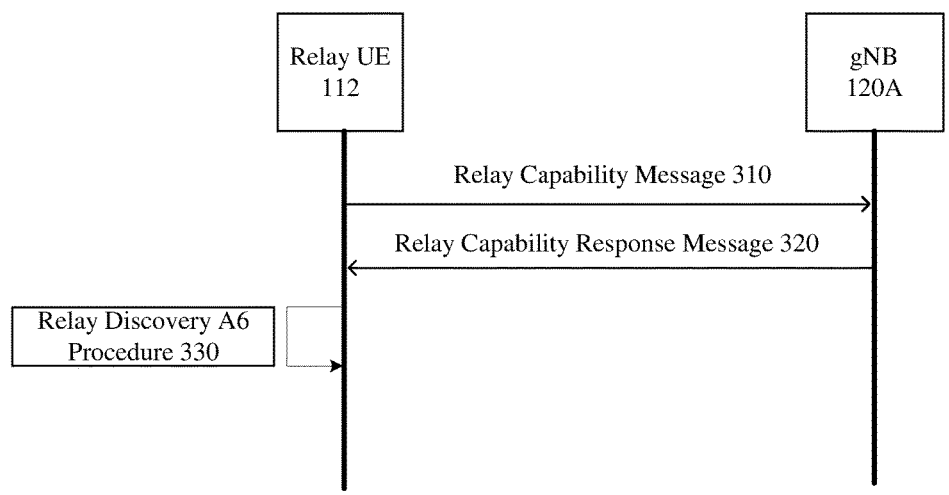
FIG. 3 shows a first exemplary signaling diagram showing a first method to implement access control at a relay UE comprising sending relay capabilities to the network according to various exemplary embodiments.

FIG. 3 shows a first exemplary signaling diagram 300 showing a first method to implement access control at a relay UE 112 comprising sending relay capabilities to the network according to various exemplary embodiments. The exemplary signaling diagram 300 will be described with regard to the network arrangement 100 of FIG. 1 and the UE 112 of FIG. 2. In this example, the relay UE 112 may perform access control as a relay UE by sending relay capabilities to the network.

The relay UE 112 may send a relay capability message 310 to the gNB 120A to indicate the relay capabilities of the relay UE 112. As described above, the operations described herein as performed by the gNB 120A may be performed by the gNB 120A or any other network component. In one exemplary embodiment, the relay capability message 310 may be sent as a non-access stratum (NAS) or access stratum (AS) capability message. However, the exemplary embodiments are not limited to any specific manner of sending the relay capability message 310 to the network. The relay capabilities may be, for example, the minimum set of relay capabilities supported by the hardware of the relay UE 112. Some examples of the capabilities will be provided below.

The capabilities of the relay UE 112 may be pre-programmed in the subscriber identity module (SIM) card of the relay UE 112. In another exemplary embodiment, the relay UE 112 may communicate with an application server (not shown) to receive the capabilities that may be stored in the SIM card. Some examples of the relay capabilities of the relay UE 112 may include the maximum number of remote UEs (including remote UEs in RRC-idle or RRC-connected states), the maximum number of simultaneous RRC-connected remote UEs, the supported services (e.g., voice, high priority data, mission critical data, low latency data, etc.), the details of the supported services (e.g., number of simultaneous voice calls/dedicated bearers, etc.), Quality of Service (QoS) for remote UE Protocol Data Unit (PDU) session, etc. Those skilled in the art will understand that this is not a complete list of all the relay capabilities that may be sent via the relay capability message 310.

In response to the relay capability message 310, the gNB 120A may return a relay capability response message 320. The gNB 120A may authorize the relay UE 112 to become a relay UE for a full set of the reported capabilities or a subset of the capabilities. If the relay UE 112 is authorized to act as a relay, the relay UE 112 will perform a relay discovery advertisement procedure 330 to advertise to any remote UEs that the relay UE 112 is available to act as a relay. For example, the remote UE 110 of FIG. 1 may detect the relay advertisement of the relay UE 112 and understand that the relay UE 112 is available to act as a relay. The advertisement procedure 330 may be based on the authorized capabilities received from the network in the relay capability response message 320. Those skilled in the art will understand that any association procedure may be used to connect the remote UE 110 to the relay UE 112 to use the relay UE 112 as a relay once the remote UE 110 discovers the relay UE 112 based on the relay discovery advertisement procedure 330.

The gNB 120A is not required to authorize the relay UE 112 to act as a relay for remote UEs. For example, the relay capability response message 320 may indicate that the relay UE 112 is not authorized to act as a relay. In such a case, the relay UE 112 will not perform the relay discovery advertisement procedure 330.

Thus, in this example, the relay UE 112 may perform access control by informing the network of the relay capabilities of the relay UE 112. The example provided below will show how the relay UE 112 may restrict access based on the capability information that the relay UE 112 provides to the network.

Figure 4:
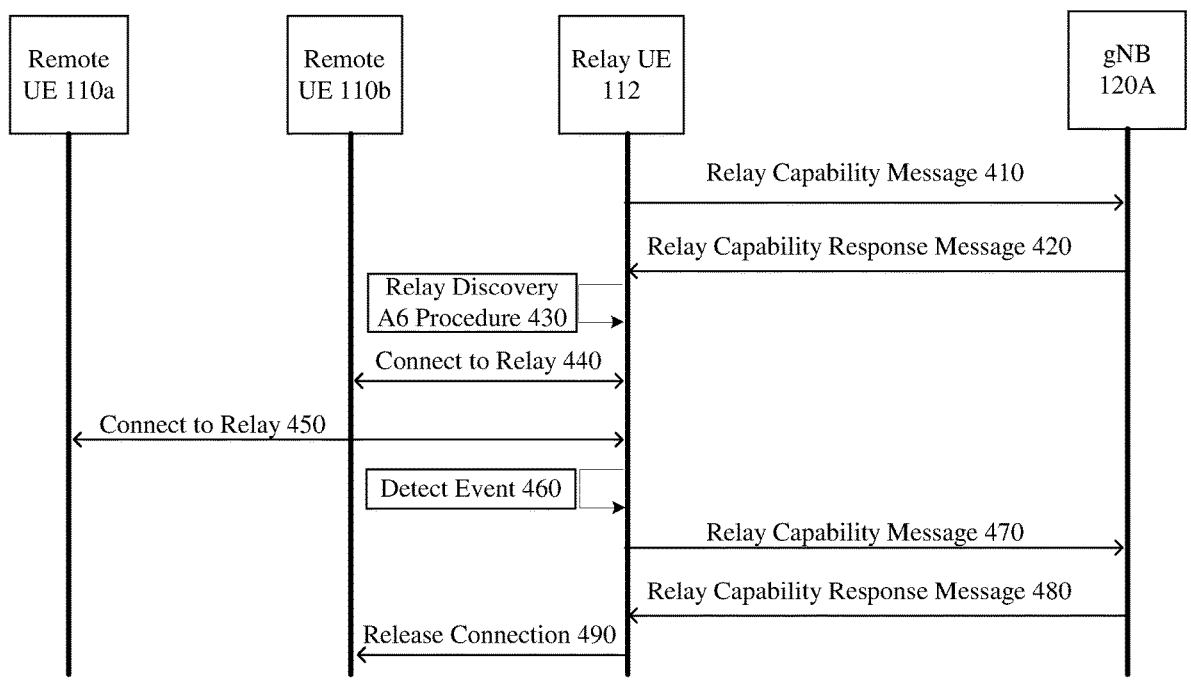
FIG. 4 shows a second exemplary signaling diagram showing further details of the first method to implement access control at a relay UE according to various exemplary embodiments.

FIG. 4 shows a second exemplary signaling diagram 400 showing further details of the first method to implement access control at a relay UE 112 according to various exemplary embodiments. The exemplary signaling diagram 400 will be described with regard to the network arrangement 100 of FIG. 1 and the relay UE 112 of FIG. 2. Similar to the example shown in FIG. 3, the relay UE 112 may exhibit access control by sending relay capabilities to the gNB 120A. This exemplary signaling diagram 400 shows that the relay UE 112 may have the ability to renegotiate the relay capabilities with the network during operation.

The relay capability message 410, the relay capability response message 420 and the relay discovery advertisement procedure 430 are similar to the corresponding operations described with respect to signaling diagram 300 of FIG. 3. In this example, the relay UE 112 was authorized to act as a relay and, in response to the relay discovery advertisement procedure 430, each of the UEs 110a and 110b have performed a connection procedure 440, 450, respectively, to connect to the relay UE 112. As described above, the connection between the relay UE 112 and the remote UEs 110a and 110b may be via a SL connection. Thus, after the connection procedures 440 and 450, the relay UE 112 is connected to both the UE 110a and the UE 110b via a SL connection and acts as a relay for the remote UEs 110a and 110b to communicate with the gNB 120A.

The relay UE 112 may detect an event 460. The event 460 may include any event that the relay UE 112 determines to affect the currently authorized relay capabilities of the relay UE 112. Some examples of the event 460 may include the battery level of the relay UE 112 being less than a threshold, the temperature of the relay UE 112 being above a threshold, high priority traffic initiation for the relay UE 112 that is intended for the consumption of the relay UE 112, etc. Again, these are examples of events 460, other events may also cause the relay UE 112 to reconsider the current relay capabilities.

In response to detecting the event 460, the relay UE 112 may send another relay capability message 470 that includes revised relay capabilities of the relay UE 112. The revised capabilities may include any change to the relay capabilities that were sent in the previous relay capability message 410 or the authorized relay capabilities that were received in the relay capability response message 420. For example, the relay UE 112 may indicate a lower maximum number of remote UEs for which the relay UE 112 may act as a relay. However, this is only one example and the relay UE 112 may revise any number of relay capabilities.

In response to the relay capability message 470, the network 130 may send another relay capability response message 480 to authorize the relay capabilities of the relay UE 112 based on the revised relay capabilities sent by the relay UE 112. In this example, the authorized relay capabilities in the relay capability response message 480 may not include enough relay connections to accommodate both the remote UEs 110a and 110b. Thus, in this example, the relay UE 112 may perform a connection release procedure 490 to release the SL connection with the remote UE 110b. Those skilled in the art will understand that the connection release procedure 490 is merely an example of the actions that the relay UE 112 may take as a result of the newly authorized relay capabilities.

In the above example, it was considered that the relay UE 112 detected the event 460. In another example, the network (e.g., gNB 120A) may detect the event and send an updated relay capability response message to the relay UE 112. For example, the event detected by the network may include congestion at the relay UE 112, incoming high priority traffic for consumption by the relay UE 112, etc. In this example, the network may reevaluate the relay capabilities sent by the relay UE 112 in the relay capability message 410 and the authorized relay capabilities sent in the relay capability response message 420 and send a new relay capability response message with a new set of relay capabilities. The relay UE 112 may then take the appropriate actions based on the new set of relay capabilities.

In addition, in the above example, it was considered that the relay UE 112 received a relay capability response message 480 in response to the relay capability message 470 that provided authorization for a reduced set of relay capabilities. However, the relay capability response message 480 may also indicate to the relay UE 112 that it is no longer authorized to act as a relay UE. For example, the network may determine that the capabilities sent by the relay UE 112 are insufficient for the relay UE 112 to act as a relay UE. From the above examples, it may be seen how the relay UE 112 may perform relay access control by sending relay capabilities to the network.

Figure 5A:
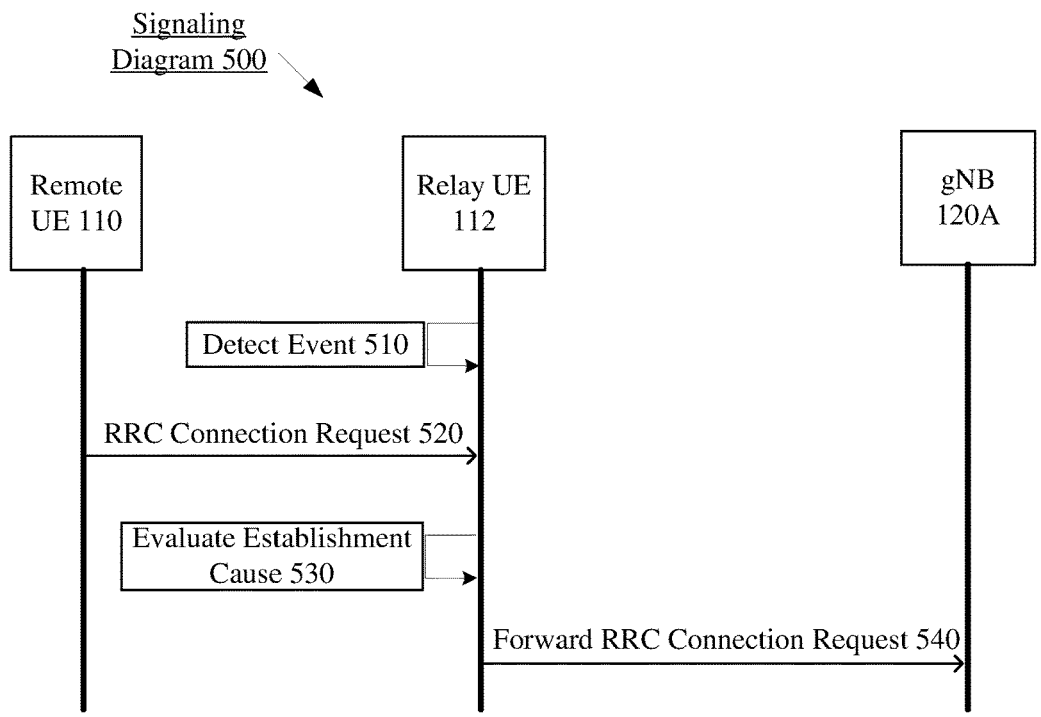
FIGS. 5a and 5b show exemplary signaling diagrams showing a second method to implement access control at a relay UE based on an establishment cause in an RRC Connection Request according to various exemplary embodiments.
Figure 5B:
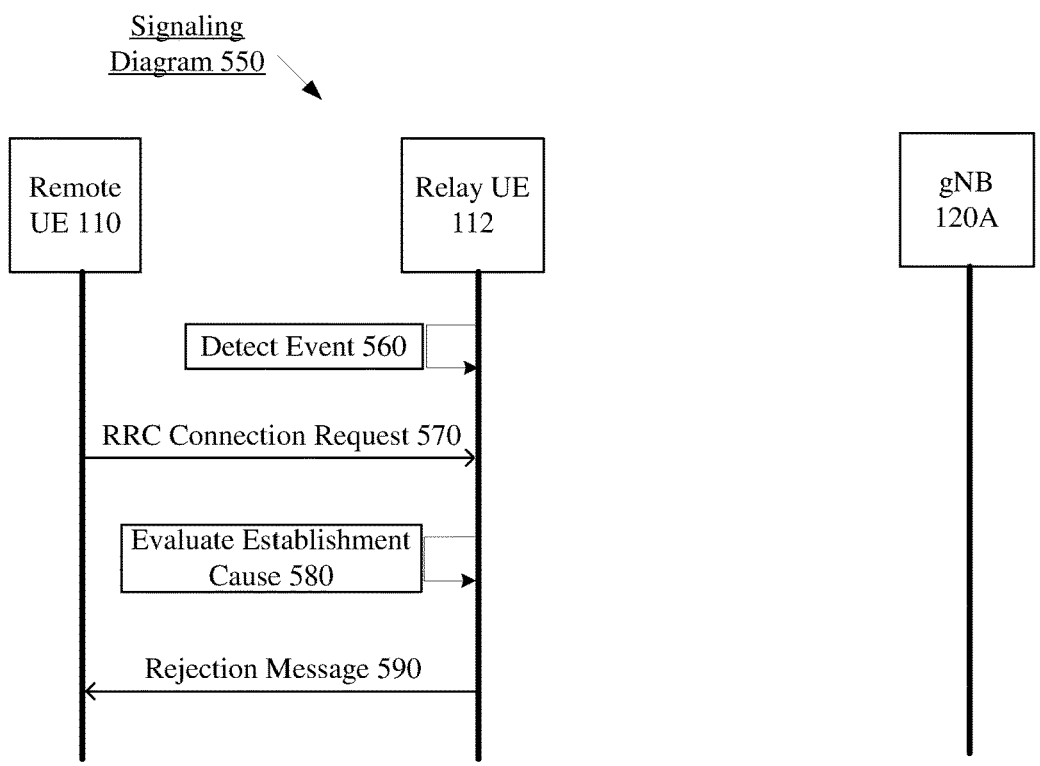

FIGS. 5a and 5b show exemplary signaling diagrams 500 and 550 showing a second method to implement access control at a relay UE 112 based on an establishment cause in an RRC Connection Request according to various exemplary embodiments. The exemplary signaling diagrams 500 and 550 will be described with regard to the network arrangement 100 of FIG. 1 and the UE 112 of FIG. 2. In this example, the relay UE 112 may perform access control based on the establishment cause in the RRC Connection Request from the remote UE 110.

Those skilled in the art will understand that when a UE attempts to establish an RRC connection with the network, a RRC Connection Request is sent by the UE. Included in the RRC Connection Request may be an establishment cause, e.g., the reason for attempting to establish the RRC-connected state. Examples of connection causes may include Emergency, High Priority Access, Mobile Terminating Access, Mobile Originating Signaling, Mobile Originating Data, etc. The relay UE 112 may categorize these causes as high priority or low priority and control access based on the categorization of the establishment cause as will be described below with respect to signaling diagrams 500 and 550. The categorizing of a specific establishment cause as high priority or low priority may be determined on a case-by-case basis.

Referring to FIG. 5a, the relay UE 112 may detect an event 510. The event 510 may include, for example, the relay UE 120 is experiencing congestion, a battery level of the relay UE 112 is below a threshold, etc. Again, as described above, the event 510 may be related to a condition for which the relay UE 112 may want to reevaluate the relay capabilities of the relay UE 112, e.g., perform access control based on the current capabilities of the relay UE 112.

The relay UE 112 may receive a RRC Connection Request 520 from the remote UE 110. The RRC Connection Request will include, as described above, an establishment cause. The relay UE 112 may evaluate the establishment cause 530. As described above, the relay UE 112 may categorize the establishment cause as high priority or low priority. In this example, it may be considered that the establishment cause is categorized as high priority. Since the establishment cause is high priority, the relay UE 112 may forward the RRC Connection Request 540 to the gNB 130.

In this example, it is considered that the high priority establishment cause means that even though the event 510 has been detected, it is important enough for the remote UE 110 to establish the RRC connection that the relay UE 112 should forward the request.

Referring to FIG. 5b, the relay UE 112 may detect an event 560. The event 560 may be similar to the event 510 as described above with reference to FIG. 5a. The relay UE 112 may receive a RRC Connection Request 570 including the establishment cause from the remote UE 110. The relay UE 112 may evaluate the establishment cause 580 and categorize as high priority or low priority. In this example, it may be considered that the establishment cause is categorized as low priority. Since the establishment cause is low priority, the relay UE 112 may reject the RRC Connection Request by sending a rejection message 590 to the remote UE 110. The rejection message 590 may be, for example, a sidelink reject message. However, other types of rejection messages may also be used. The rejection message 590 may include information for the remote UE 110, such as, the reason for the rejection (e.g., access control), a further candidate relay UE for the remote UE, etc.

In the above examples various events have been described. Another type of event that may be determined by the relay UE 112 is that a type of service is not allowed by the network. For example, the network may not allow a voice call via the relay UE 112 for any of a variety of reasons. The relay UE 112 may determine that voice calls are not allowed. Thus, when the relay UE 112 receives an establishment cause indicating that the reason for the RRC connection is for a voice call, the relay UE 112 may reject the request because the service is not supported. Thus, in this example, the establishment cause is not categorized, but rather the type of the establishment cause is determined and then the relay UE 112 determines whether to forward or reject the RRC Connection Request.

Thus, the above examples illustrate manners by which the relay UE 112 may perform access control based on information included in the RRC Connection Request that is received from the remote UE 110. Based on this information, the relay UE 112 may reject the RRC Connection Request or forward the RRC Connection Request to the network.

Figure 6A:
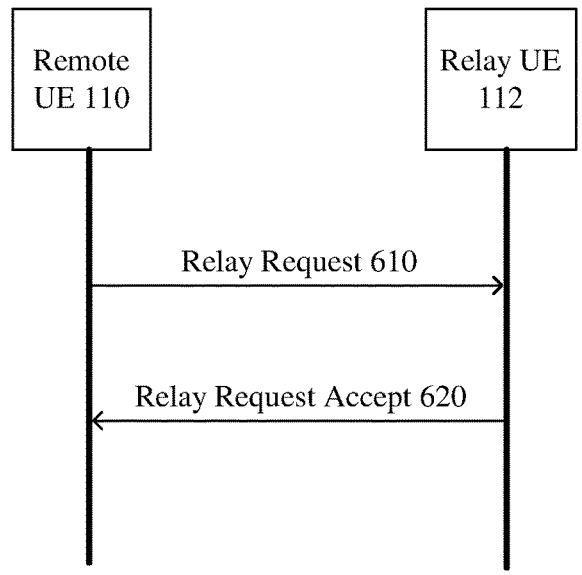
FIGS. 6a and 6b show exemplary signaling diagrams showing a third method to implement access control at a relay UE during SL one-to-one communications according to various exemplary embodiments.
Figure 6B:
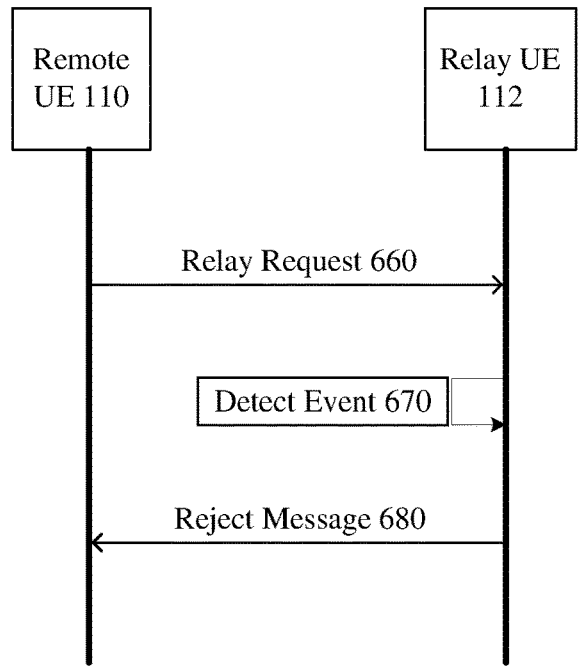

FIGS. 6a and 6b show exemplary signaling diagrams 600 and 650 showing a third method to implement access control at a relay UE 112 during SL one-to-one communications according to various exemplary embodiments. The exemplary signaling diagrams 600 and 650 will be described with regard to the network arrangement 100 of FIG. 1 and the UE 112 of FIG. 2. In this example, the relay UE 112 may perform access control during SL one-to-one communications for a relay procedure between the relay UE 112 and the remote UE 110.

Referring to FIG. 6a, the remote UE 110 sends a relay request 610 to the relay UE 112. The relay request 610 may be sent via an SL communication link established between the remote UE 110 and the relay UE 112. The relay request 610 may include the service type for which the remote UE 110 is requesting the relay. The relay UE 112 may then determine whether to accept or reject the relay. The determination may be based on the service type or may be based on any other factor that the relay UE 112 uses to determine whether to accept the relay. The factors are not limited to the information provided in the relay request 610. For example, the relay UE 112 may determine that it already has a number of operating relays and therefore the relay UE 112 may not accept additional relay requests. From these examples it can be seen that the relay UE 112 may determine to accept or reject the relay request 610 based on any one or multiple factors. In this example, it may be considered that the relay UE 112 accepts the relay request 610 and sends a relay request accept message 620 via the SL communication link. The relay UE 112 may then act as a relay for the remote UE 110.

Referring to FIG. 6b, the remote UE 110 sends a relay request 660 to the relay UE 112 via an SL communication link established between the remote UE 110 and the relay UE 112. As described above, the relay request 660 may include the service type for which the remote UE 110 is requesting the relay. The relay UE 112 may then detect an event 670. Multiple examples of events have been described above and the event 670 may include any of the described exemplary events or any other type of event that the relay UE 112 determines to be relevant to the relay request 660 (e.g., battery level, congestion, etc.). In this example, it may be considered that based on the detected event 670 and the requested service type, the relay UE 112 will reject the request. Thus, the relay UE 112 will send a reject message 680 via the SL communication link. Again, the rejection message 680 may include any type of information such as the reason for the rejection (e.g., access control), other available relay UEs, etc.

Thus, the above examples show that the relay UE 112 may determine whether to accept or reject a relay request from a remote UE 110 that is received via the SL communication link. The acceptance or rejection of the relay request may then also be communicated to the remote UE 110 using the SL communication link. In the above examples, there were various reasons provided for accepting or rejecting the relay requests. Those skilled in the art will understand that there may be a variety of reasons for the relay UE 112 to either accept or reject the relay request. The particular reason is irrelevant to this method of access control. That is, this exemplary method of access control is related to the relay UE 112 making a determination as to whether to accept or reject the request that is made during the SL one-to-one communication with the remote UE 110.

Figure 7A:
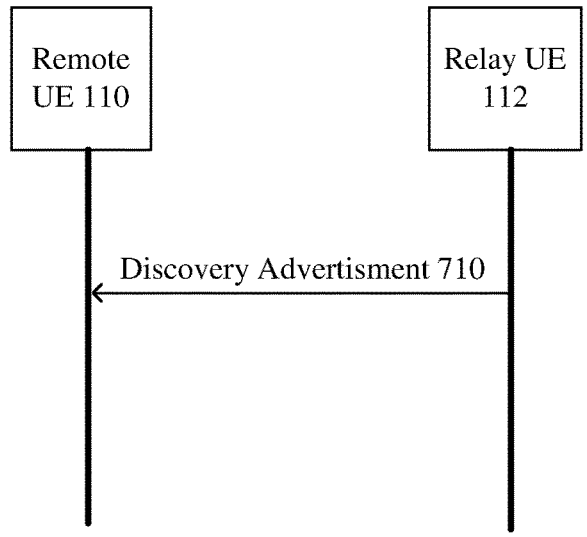
FIGS. 7a and 7b show exemplary signaling diagrams showing a fourth method to implement access control at a relay UE during an SL discovery procedure according to various exemplary embodiments.
Figure 7B:
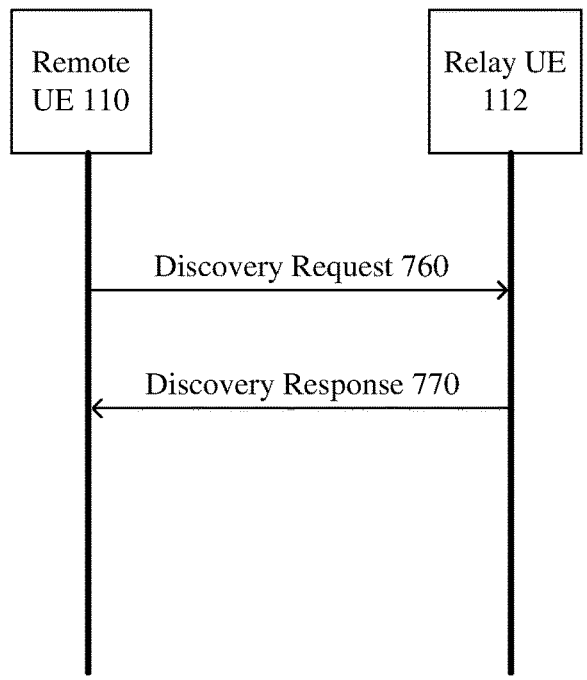

FIGS. 7a and 7b show exemplary signaling diagrams 700 and 750 showing a fourth method to implement access control at a relay UE 112 during an SL discovery procedure according to various exemplary embodiments. The exemplary signaling diagrams 700 and 750 will be described with regard to the network arrangement 100 of FIG. 1 and the UE 112 of FIG. 2. In this example, the relay UE 112 may perform access control during an SL discovery procedure.

As described above, when the relay UE 112 is available to operate as a relay, the relay UE 112 may engage in a discovery procedure with any remote UEs 110 that desire to use the relay UE 112 as a relay. There may be different types of discovery procedures and two examples will be provided below including examples of how access control may be performed by the relay UE 112 during the respective discovery procedures.

Referring to FIG. 7a, the relay UE 112 may send a discovery advertisement 710. The discovery advertisement 710 may include information that indicates the relay UE 112 is available to act as a relay UE. The discovery advertisement 710 may also include the conditions under which the relay UE 112 may operate as a relay UE. For example, the discovery advertisement 710 may include information such as "Only high priority access is allowed." Thus, in this example, while the relay UE 112 is available to act as a relay UE, there are conditions on the availability. The conditions may be determined by the relay UE 112 and may be based on any factor or combination of factors (e.g., battery level, congestion, relay UE 112 priority traffic, etc.). In another example, the network may determine the conditions with which the relay UE 112 should offer the relay service and signal the condition(s) to the relay UE 112.

The remote UE 110 may receive the discovery advertisement 710 and determine whether the remote UE 110 satisfies the conditions to use the relay UE 112 as a relay. In this example, "high priority access" may be defined as including, for example, IMS voice/video, MT signaling, MO signaling, and emergency calls. It should be understood that this is only one possible definition for high priority access and the specific definition may be determined on a case-by-case basis. The remote UE 110 may determine whether the service for which the remote UE 110 would like to use the relay UE 112 as a relay satisfies the condition. If it does, the remote UE 110 may make the relay request to the relay UE 112 to act as a relay.

Those skilled in the art will understand that the discovery advertisement 710 is typically a broadcast message that is available for all UEs within the area of the relay UE 112. That is, while signaling diagram 700 shows the discovery advertisement 710 as between the relay UE 112 and the remote UE 112, other UEs may also receive the same advertisement message 710.

Referring to FIG. 7b, the remote UE 110 may send a discovery request 760 to the relay UE 112. The discovery request 760 may be in response to a discovery advertisement (not shown) that is broadcast by the relay UE 112. However, in this exemplary embodiment, as opposed to the exemplary embodiment shown in signaling diagram 700, the discovery advertisement may not include any conditional information, e.g., the discovery advertisement is an indication that the relay UE 112 is available to act as a relay.

In response to the discovery request, the relay UE 112 may send a discovery response 770 to the remote UE 110. The discovery response 770 may include the conditions under which the relay UE 112 may operate as a relay UE. For example, the discovery response 770 may include information such as "Only high priority access is allowed." Again, in this example, while the relay UE 112 is available to act as a relay UE, there are conditions on the availability. After receiving the discovery response 770 including the corresponding conditions, the remote UE 110 may determine whether to continue with the relay setup procedure. For example, if the remote UE 110 is attempting to use the relay UE 112 as a relay for a service that is considered to be high priority, the remote UE 110 may continue to attempt to establish the relay UE 112 as a relay. On the other hand, if the remote UE 110 determines that a low priority service is going to be requested, the remote UE 110 may discontinue communications with the relay UE 112 and attempt to find a different relay UE or setup a direct communication link with the network.

In the above examples, the exemplary condition is based on high priority access. However, it should be understood that the relay UE 112 may set any condition for which to grant access to a remote UE for purposes of acting as a relay. Thus, the above examples show a manner of controlling access based on a discovery procedure between the relay UE 112 and the remote UE 110.

Figure 8A:
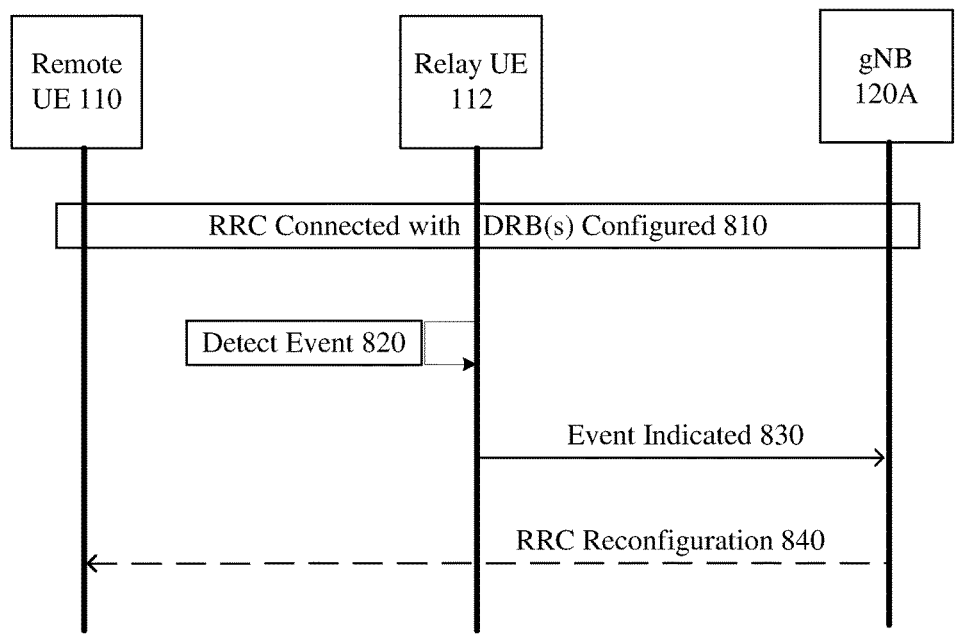
FIGS. 8a and 8b show exemplary signaling diagrams showing a fifth method to implement access control at a relay UE based on the relay UE detecting an event according to various exemplary embodiments.
Figure 8B:
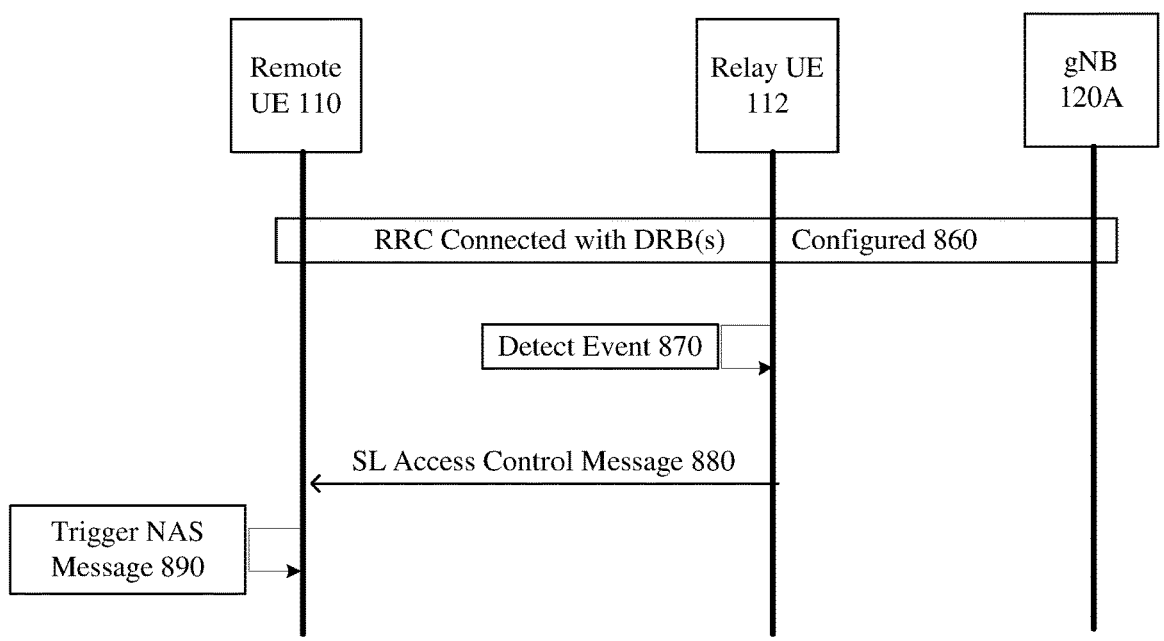

FIGS. 8a and 8b show exemplary signaling diagrams 800 and 850 showing a fifth method to implement access control at a relay UE 112 based on the relay UE 112 detecting an event according to various exemplary embodiments. The exemplary signaling diagrams 800 and 850 will be described with regard to the network arrangement 100 of FIG. 1 and the UE 112 of FIG. 2. In this example, the relay UE 112 may perform access control by detecting an event and signaling an indication of the event to the network (e.g., gNB 120A) or the remote UE 110. Each of these exemplary embodiments will be described below.

Referring to FIG. 8a, it may initially be considered that the relay UE 112 is currently acting as a relay UE for communications between the remote UE 110 and the gNB 120A. It may further be considered that the remote UE 110 is currently in an RRC connected state 810 that includes one or more dedicated radio bearers (DRBs) with the network. While this relay is active, the relay UE 112 may detect an event 820. Similar to the events described above, the event 820 may be any event for which the relay UE 112 determines that the relay capabilities of relay UE 112 should be reevaluated (e.g., battery level, congestion, etc.).

When the event 820 is detected, the relay UE 112 may send an event indicated message 830 to the gNB 120A. The event indicated message 830 may include a specific indication of the event 820 that was detected or may include information indicating reduced relay capabilities of the relay UE 112. The gNB 120A may determine, based on the information included in the event indicated message 830, that the relay UE 112 has reduced relay capabilities. Based on the determined reduced relay capabilities, the gNB 120A may send an RRC Reconfiguration message 840 to the remote UE 110. The RRC Reconfiguration message may modify the RRC connection, may drop some of the DRBs, may drop all of the DRBs, depending on the current relay capabilities of the relay UE 112.

Referring to FIG. 8b, similar to FIG. 8a, it may initially be considered that the relay UE 112 is currently acting as a relay UE for communications between the remote UE 110 and the gNB 120A and the remote UE 110 is currently in an RRC connected state 860 that includes one or more DRBs with the network. While this relay is active, the relay UE 112 may detect an event 870. Similar to the events described above, the event 870 may be any event for which the relay UE 112 determines that the relay capabilities of relay UE 112 should be reevaluated (e.g., battery level, congestion, etc.).

When the event 870 is detected, the relay UE 112 may send an SL access control message 880 to the remote UE 110. The SL access control message 880 may include a specific indication of the event 870 that was detected or may include information indicating reduced relay capabilities of the relay UE 112. The remote UE 110 may determine, based on the information included in the SL access control message 880, that the relay UE 112 has reduced relay capabilities. Based on the determined reduced relay capabilities, the remote UE 110 may trigger a NAS procedure 890 with the network to renegotiate the RRC connection. For example, via the NAS procedure 890, the remote UE 110 may request that modification of the service or some or all of the DRBs to be dropped.

Thus, in the above examples, the relay UE 112 may control access based on signaling an event to either the remote UE 110 or the network (e.g., gNB 120A) which triggers these entities to adjust a connection based on the relay capabilities of the relay UE 112.

Figure 9A:
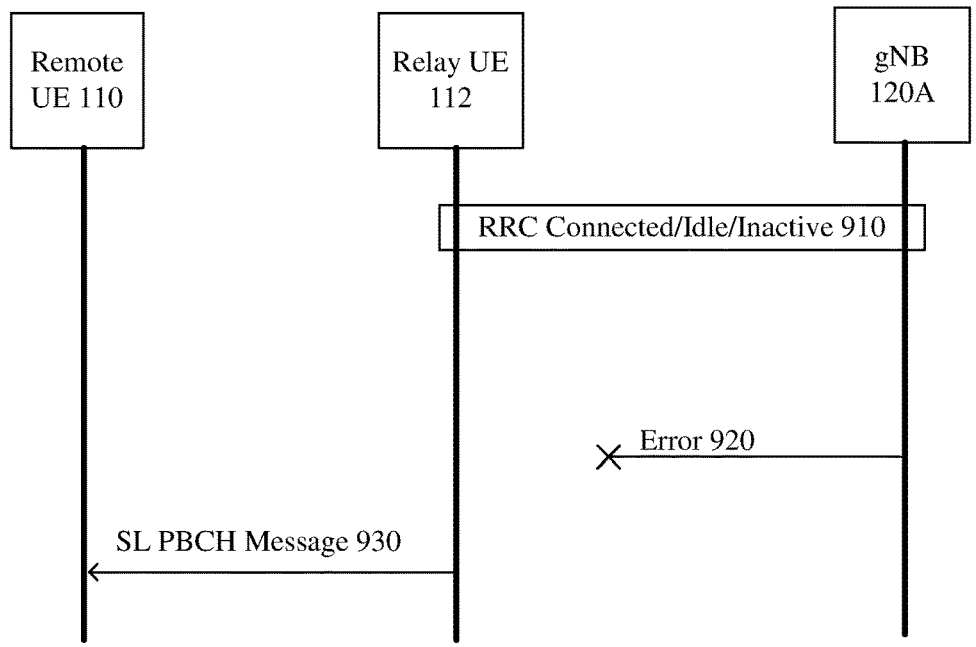
FIGS. 9a and 9b show exemplary signaling diagrams 900 and 950 showing a sixth method to implement access control at a relay UE 112 based on a link error between the relay UE 112 and the network according to various exemplary embodiments.
Figure 9B:
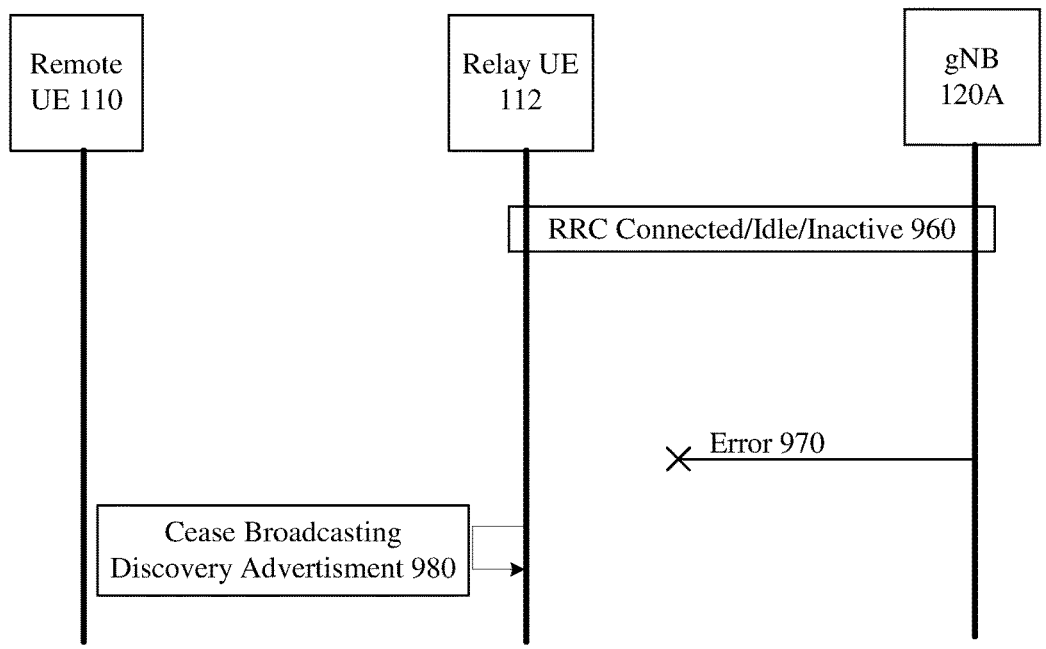

FIGS. 9a and 9b show exemplary signaling diagrams 900 and 950 showing a sixth method to implement access control at a relay UE 112 based on a link error between the relay UE 112 and the network according to various exemplary embodiments. The exemplary signaling diagrams 900 and 950 will be described with regard to the network arrangement 100 of FIG. 1 and the UE 112 of FIG. 2. In this example, the relay UE 112 may perform access control by detecting a link error between the relay UE 112 and the gNB 120A and performing operations to indicate the error to the remote UE 110 to indicate that the relay UE 112 is not available to act as a relay because of the error.

Referring to FIG. 9a, it may initially be considered that the relay UE 112 is currently in any one of an RRC connected, RRC Idle or RRC Inactive state 910 with the gNB 120A. Those skilled in the art will understand the various states which the relay UE 112 may be in with respect to the gNB 112. While in this state, the communication link between the relay UE 112 and the gNB 120A may experience an error 920. Throughout this description, a direct communication link between a UE and a base station of the 5G NR-RAN 120 may be referred to as a "Uu link." The error 920 on the Uu link may include any number of errors that cause the Uu link to work improperly. When the Uu link between the relay UE 112 and the gNB 120A is not working properly, the relay UE 112 cannot operate as a relay because the information that the relay UE 112 will be relaying (in either the UL or DL) will be communicated via the Uu link. Thus, the relay UE 112 must inform the remote UE 110 that the relay UE 112 is currently incapable of acting as a relay.

In this exemplary embodiment, the relay UE 112 indicates this information to the remote UE 110 via a SL Physical Broadcast Channel (PBCH) message 930. In this manner, the remote UE 110 is informed that the relay UE 112 is not available to act as a relay.

Referring to FIG. 9b, again, it may initially be considered that the relay UE 112 is currently in any one of an RRC connected, RRC Idle or RRC Inactive state 960 with the gNB 120A. While in this state, the Uu link between the relay UE 112 and the gNB 120A may experience an error 970. In this exemplary embodiment, the relay UE 112 indicates this information to the remote UE 110 (and any other remote UEs) by ceasing 980 to broadcast the discovery advertisement. It should be understood that the ceasing 980 does not inform the remote UE 110 of the specific problem, but rather the lack of a discovery advertisement indicates that the relay UE 112 is not available to act as a relay.

The above examples show the relay UE 112 controlling access by informing (directly or indirectly) the remote UE 110 that the Uu link between the relay UE 110 and the gNB 120A is experiencing an error and therefore the relay UE 112 is not available to act as a relay.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A method, comprising:
at a relay user equipment (UE) configured to operate as a relay between a remote UE and a network component:
determining at least one relay capability of the relay UE; and
performing a relay access control operation that indicates to the remote UE whether the remote UE is permitted to use the relay UE as the relay, wherein the access control operation comprises:
transmitting, to the network, a relay capability message including the at least one relay capability:
receiving, from the network, an authorized relay capability message; and
broadcasting a relay discovery advertisement including information based on the authorized relay capability message;
detecting an event that impacts the at least one relay capability, wherein the at least one relay capability is modified based on the event;
transmitting, to the network, an updated relay capability message including the modified at least one relay capability;
receiving, from the network, an updated authorized relay capability message; and
performing an operation with respect to a relay link between the relay UE and the remote UE, wherein the operation is based on the updated authorized relay capability message.

2. The method of claim 1, wherein the at least one relay capability is based on an event detected by the relay UE.

3. The method of claim 1, wherein the relay access control operation comprises:
determining an establishment cause received in a radio resource connection (RRC) request from the remote UE; and
based on the establishment cause, one of (i) forwarding the RRC connection request to the network or (ii) rejecting the RRC request, wherein the rejecting comprises sending a rejection message to the remote UE.

4. The method of claim 1, further comprising:
receiving a relay request from the remote UE, wherein the request is received via a SL communication link between the relay UE and the remote UE;
determining whether to accept or reject the request based on the at least one relay capability of the relay UE.

5. The method of claim 1, wherein the relay access control operation comprises:
broadcasting a relay advertisement including conditions for the remote UE to access the relay UE as the relay.

6. The method of claim 1, wherein the relay access control operation comprises:

receiving a relay discovery request from the remote UE; and transmitting, to the remote UE via a SL communication link, a discovery response message including conditions for the remote UE to access the relay UE as the relay.

7. The method of claim 1, further comprising:

detecting an event that impacts the at least one relay capability; and transmitting an indication of the detected event to one of the network or the remote UE, wherein the indication causes a change in an RRC configuration between the remote UE and the network.

8. The method of claim 1, further comprising:

determining an error on a communication link between the relay UE and the network; and based on determining the error, one of (i) transmitting, to the remote UE, an indication of the error or (ii) ceasing broadcasting of a relay discovery advertisement.

9. A relay user equipment (UE), comprising:

a transceiver configured to establish a first communication link between the relay UE and a wireless network and a second sidelink (SL) communication link between the relay UE and a remote UE, wherein the relay UE is further configured to operate as a relay between a remote UE and the wireless network; and a processor configured to determine at least one relay capability of the UE and perform a relay access control operation that indicates to the remote UE whether the remote UE is permitted to use the relay UE as the relay, wherein the access control operation comprises:

transmitting, to the network, a relay capability message including the at least one relay capability;

receiving, from the network, an authorized relay capability message; and broadcasting a relay discovery advertisement including information based on the authorized relay capability message;

detecting an event that impacts the at least one relay capability, wherein the at least one relay capability is modified based on the event;

transmitting, to the network, an updated relay capability message including the modified at least one relay capability;

receiving, from the network, an updated authorized relay capability message; and performing an operation with respect to a relay link between the relay UE and the remote UE, wherein the operation is based on the updated authorized relay capability message.

10. The relay UE of claim 9, wherein the processor performs the relay access control operation by determining an establishment cause received in a radio resource connection (RRC) request from the remote UE and based on the establishment cause, one of (i) forwarding the RRC connection request to the wireless network or (ii) rejecting the RRC request, wherein the rejecting comprises sending a rejection message to the remote UE.

11. The relay UE of claim 9, wherein the processor performs the relay access control operation by receiving a relay request from the remote UE and determining whether to accept or reject the request based on the at least one relay capability of the relay UE.

12. The relay UE of claim 9, wherein the processor performs the relay access control operation by receiving a relay discovery request from the remote UE and transmitting, to the remote UE via a SL communication link, a discovery response message including conditions for the remote UE to access the relay UE as the relay.

13. The relay UE of claim 9, wherein the processor performs the relay access control operation by detecting an event that impacts the at least one relay capability and transmitting an indication of the detected event to one of the network or the remote UE, wherein the indication causes a change in an RRC configuration between the remote UE and the wireless network.

14. The relay UE of claim 9, wherein the processor performs the relay access control operation by determining an error on the first communication link and based on determining the error, one of (i) transmitting, to the remote UE, an indication of the error or ceasing broadcasting of a relay discovery advertisement.

15. An integrated circuit, comprising:

first circuitry configured to determine at least one relay capability of a user equipment (UE) comprising the integrated circuit, wherein the UE is configured to operate as a relay between a remote UE and a wireless network; and second circuitry configured to perform a relay access control operation that indicates to the remote UE whether the remote UE is permitted to use the UE as the relay, wherein the access control operation comprises:

transmitting, to the network, a relay capability message including the at least one relay capability;

receiving, from the network, an authorized relay capability message; and broadcasting a relay discovery advertisement including information based on the authorized relay capability message;

detecting an event that impacts the at least one relay capability, wherein the at least one relay capability is modified based on the event;

transmitting, to the network, an updated relay capability message including the modified at least one relay capability;

receiving, from the network, an updated authorized relay capability message; and performing an operation with respect to a relay link between the relay UE and the remote UE, wherein the operation is based on the updated authorized relay capability message.

* * * * *